(12) United States Patent
Pei

(10) Patent No.: US 10,452,402 B2
(45) Date of Patent: Oct. 22, 2019

(54) OPERATION INSTRUCTION RESPONSE CONTROL METHOD AND TERMINAL FOR HUMAN-MACHINE INTERFACE

(71) Applicant: BEIJING A&E TECHNOLOGIES CO., LTD, Beijing (CN)

(72) Inventor: Tingbin Pei, Beijing (CN)

(73) Assignee: SHENZHEN A&E INTELLIGENT TECHNOLOGY INSTITUTE CO., LTD., Shenzhen, Guangdong Province (CN)

( * ) Notice: Subject to any disclaimer, the term of this patent is extended or adjusted under 35 U.S.C. 154(b) by 323 days.

(21) Appl. No.: 15/553,982

(22) PCT Filed: Aug. 12, 2015

(86) PCT No.: PCT/CN2015/086772
§ 371 (c)(1),
(2) Date: Aug. 25, 2017

(87) PCT Pub. No.: WO2016/023493
PCT Pub. Date: Feb. 18, 2016

(65) Prior Publication Data
US 2018/0253313 A1 Sep. 6, 2018

(30) Foreign Application Priority Data
Aug. 15, 2014 (CN) .......................... 2014 1 0404439

(51) Int. Cl.
*H04L 29/06* (2006.01)
*H04L 12/911* (2013.01)
(Continued)

(52) U.S. Cl.
CPC ............ *G06F 9/3836* (2013.01); *G06F 9/451* (2018.02); *G06F 9/48* (2013.01); *G06F 9/4881* (2013.01)

(58) Field of Classification Search
None
See application file for complete search history.

(56) References Cited

U.S. PATENT DOCUMENTS 7,664,902 B1 * 2/2010 Chow ................. G06F 12/1416
710/301
9,503,922 B1 * 11/2016 Ford ..................... H04W 28/08
(Continued)

FOREIGN PATENT DOCUMENTS

| CN | 101408851 A | 4/2009 |
| CN | 103605563 A | 2/2014 |
| CN | 104239130 A | 12/2014 |

*Primary Examiner* — Hyun Nam
(74) *Attorney, Agent, or Firm* — Cheng-Ju Chiang

(57) ABSTRACT

The present disclosure provides an operation instruction response control method and terminal for a human-machine interface. An operation instruction is compared with an operation instruction at the tail of an operation instruction queue while the human-machine interface is in a busy state, and stored in the operation instruction queue while the operation instruction is inequivalent to the operation instruction at the tail of the operation instruction queue; the operation instruction is stored in the operation instruction queue directly while the human-machine interface is not in the busy state. The present disclosure is capable of keeping receiving operation instructions while the human-machine interface is busy, and filtering out invalid operation instructions to avoid the backlog, which shortens the delay time of the response to the operation instructions.

11 Claims, 6 Drawing Sheets

(51) Int. Cl.
*G06F 9/38* (2018.01)
*G06F 9/48* (2006.01)
*G06F 9/451* (2018.01)

(56) References Cited

U.S. PATENT DOCUMENTS

| | | |
|---|---|---|
| 2008/0040677 A1 | 2/2008 | Atarashi et al. |
| 2008/0092131 A1 | 4/2008 | McIntyre et al. |
| 2014/0092745 A1* | 4/2014 | Hui .................... H04W 28/12 370/236 |
| 2014/0119261 A1* | 5/2014 | Wang .................. H04W 72/04 370/312 |
| 2017/0070363 A1* | 3/2017 | Watkins ............... H04L 12/423 |

* cited by examiner

OPERATION INSTRUCTION RESPONSE CONTROL METHOD AND TERMINAL FOR HUMAN-MACHINE INTERFACE

CROSS-REFERENCE TO RELATED APPLICATIONS

The present application is a 35 U.S.C. § 371 National Phase conversion of International (PCT) Patent Application No. PCT/CN2015/086772 filed Aug. 12, 2015, which claims foreign priority of Chinese Patent Application No. 201410404439.0, filed on Aug. 15, 2014 in the State Intellectual Property Office of China, the contents of all of which are hereby incorporated by reference.

TECHNICAL FIELD

Embodiments of the present disclosure generally relate to information acquisition and interaction technology, and in particular relate to an operation instruction response control method and terminal for a human-machine interface.

BACKGROUND

A Human Machine Interface (HMI) is a medium for interacting and exchanging information between a system and a user, which is responsible for receiving operation instructions of a user and responding to the operation instructions. In the actual operation processes, the response of the human-machine interface with respect to the operation instructions of the user often has some delay. The specific delay time depends on the operation load of the human-machine interface, that is, the delay of the response with respect to the operation instructions will be longer when the operation load of the human-machine interface is heavier. However, a longer delay easily makes the user to mistake that the human-machine interface does not respond to the operation instruction, and thus continue to issue the operation instruction which has not responded by the human-machine interface repeatedly, which further increases the operation load of the human-machine interface, and even cause the crash of the operation of the human-machine interface.

In order to solve the above-mentioned problems, there are two main methods provided by the prior art: one is to suspend the response with respect to the operation instruction of the user when the human-machine interface is busy, that is, the operation load is heavier, until the human-machine interface is idle; the other is to receive and forward the operation instruction of the user to the human-machine interface via an operation instruction queue, and then the human-machine interface can respond to the operation instruction.

However, the above-mentioned first method of the prior art completely suspends responding to the operation instruction of the user, which is liable to cause the loss of effective operation instructions issued by the user while the human-machine interface is busy. The second method does not consider that the human-machine interface is busy or idle, and stores all the received operation instructions to the operation instruction queue. Since all the operation instructions in the operation instruction queue will eventually be called and executed by the human-machine interface, the backlog of a plenty of invalid operation instructions will be caused if the user repeatedly issues the operation instruction for multiple times while the human-machine interface is busy, which increases the follow-up operation burden of the human-machine interface, and thus greatly affecting the user's experience.

SUMMARY

In view of the above, the technical problem to be solved by the embodiments of the present disclosure is to provide an operation instruction response control method and terminal for a human-machine interface, which is capable of keeping receiving operation instructions while the human-machine interface is busy, and filtering out invalid operation instructions to avoid the backlog, so as to shorten the delay time of the response to the operation instructions.

In order to solve the above-mentioned technical problem, a technical aspect of the present disclosure is to provide an operation instruction response control method for a human-machine interface. The method includes: obtaining a new operation instruction of a user; determining whether the amount of the operation instruction stored in a pre-established operation instruction queue is greater than or equal to a predetermined threshold; discarding the new operation instruction if the amount of the operation instruction stored in the operation instruction queue is greater than or equal to the predetermined threshold; determining whether the amount of the operation instruction stored in an operation instruction queue is greater than a first threshold to determine whether the human-machine interface is in a busy state if the amount of the operation instruction stored in an operation instruction queue is smaller than the predetermined threshold; determining the human-machine interface to be in the busy state and determining whether the new operation instruction of the user is equivalent to an operation instruction at the tail of the operation instruction queue if the amount of the operation instruction stored in the operation instruction queue is greater than the first threshold, and discarding the new operation instruction and executing the obtaining the new operation instruction of the user if the new operation instruction of the user is equivalent to the operation instruction at the tail of the operation instruction queue; and storing the new operation instruction in the operation instruction queue to allow the human-machine interface to call and execute the new operation instruction in the operation instruction queue if the human-machine interface is determined to be not in the busy state when the amount of the operation instruction stored in the operation instruction queue is smaller than or equal to the first threshold or the new operation instruction of the user is inequivalent to the operation instruction at the tail of the operation instruction queue.

In one embodiment, the obtaining the new operation instruction of the user includes: obtaining the new operation instruction of the user through at least one of a touch screen, a keyboard, and a mouse.

In order to solve the above-mentioned technical problem, another aspect of the disclosure is to provide an operation instruction response control method for a human-machine interface The method includes: obtain a new operation instruction of a user; determining whether the human-machine interface is in a busy state; determining whether the new operation instruction of the user is equivalent to an operation instruction at the tail of a pre-established operation instruction queue if the human-machine interface is in the busy state; and storing the new operation instruction in the operation instruction queue to allow the human-machine interface to call and execute the new operation instruction in the operation instruction queue if the human-machine interface is not in the busy state or the new operation instruction of the user is inequivalent to the operation instruction at the tail of the operation instruction queue.

In one embodiment, the determining whether the human-machine interface is in the busy state includes: determining the human-machine interface to be in the busy state if the amount of the operation instruction stored in the operation instruction queue is greater than a first threshold.

In one embodiment, wherein the determining whether the human-machine interface is in the busy state includes: determining the human-machine interface to be in the busy state if an average response time of the human-machine interface with respect to operation instructions is greater than a second threshold within a predetermined time before obtaining the new operation instruction of the user.

In one embodiment, after the obtaining the new operation instruction of the user and before the determining whether the human-machine interface is in the busy state includes: determining whether the amount of the operation instruction stored in the operation instruction queue is greater than or equal to a third threshold; executing the determining whether the human-machine interface is in the busy state if the amount of the operation instruction stored in the operation instruction queue is smaller than the third threshold; and discarding the new operation instruction if the amount of the operation instruction stored in the operation instruction queue is greater than or equal to the third threshold.

In one embodiment, the method further includes: discarding the new operation instruction and executing the obtaining the new operation instruction of the user if the new operation instruction of the user is equivalent to the operation instruction at the tail of the operation instruction queue.

In order to solve the above-mentioned technical problem, still another aspect of the disclosure is to provide a terminal with a human-machine interface. The terminal includes: a reception module configured to obtain a new operation instruction of a user; a first determination module configured to determine whether the human-machine interface is in a busy state; a second determination module configured to determine whether the new operation instruction of the user is equivalent to an operation instruction at the tail of a pre-established operation instruction queue if the first determination module determines that the human-machine interface is in the busy state; and a storage module configured to store the new operation instruction in the operation instruction queue to allow the human-machine interface to call and execute the new operation instruction in the operation instruction queue if the first determination module determines that the human-machine interface is not in the busy state or the second determination module determines that the new operation instruction of the user is inequivalent to the operation instruction at the tail of the operation instruction queue.

In one embodiment, the first determination module is configured to determine the human-machine interface to be in the busy state if the amount of the operation instruction stored in the operation instruction queue is greater than a first threshold.

In one embodiment, the first determination module is configured to determine the human-machine interface to be in the busy state if an average response time of the human-machine interface with respect to operation instructions is greater than a second threshold within a predetermined time before obtaining the new operation instruction of the user.

In one embodiment, the terminal further includes a third determination module configured to determine whether the amount of the operation instruction stored in the operation instruction queue is greater than or equal to a third threshold; the first determination module determines whether the human-machine interface is in the busy state if the amount of the operation instruction stored in the operation instruction queue is smaller than the third threshold; the terminal discards the new operation instruction if the amount of the operation instruction stored in the operation instruction queue is greater than or equal to the third threshold.

In one embodiment, the terminal discards the new operation instruction and control the reception module to obtain the new operation instruction of the user if the second determination module determines that the new operation instruction of the user is equivalent to the operation instruction at the tail of the operation instruction queue.

In order to solve the above-mentioned technical problem, the other aspect of the disclosure is to provide an operation instruction response control device for a human-machine interface. The device includes an input device, an output device, a processor, and a storage. The processor is configured to: obtain a new operation instruction of a user; determine whether the human-machine interface is in a busy state; determine whether the new operation instruction of the user is equivalent to an operation instruction at the tail of a pre-established operation instruction queue if the human-machine interface is in the busy state; and store the new operation instruction in the operation instruction queue to allow the human-machine interface to call and execute the new operation instruction in the operation instruction queue if the human-machine interface is not in the busy state or the new operation instruction of the user is inequivalent to the operation instruction at the tail of the operation instruction queue.

In one embodiment, the processor determines the human-machine interface to be in the busy state if the amount of the operation instruction stored in the operation instruction queue is greater than a first threshold.

In one embodiment, the processor determines the human-machine interface to be in the busy state if an average response time of the human-machine interface with respect to operation instructions is greater than a second threshold within a predetermined time before obtaining the new operation instruction of the user.

In one embodiment, after the processor obtains the new operation instruction of the user and before the processor determines whether the human-machine interface is in the busy state, the processor is further configured to: determine whether the amount of the operation instruction stored in the operation instruction queue is greater than or equal to a third threshold; determine whether the human-machine interface is in the busy state if the amount of the operation instruction stored in the operation instruction queue is smaller than the third threshold; and discard the new operation instruction if the amount of the operation instruction stored in the operation instruction queue is greater than or equal to the third threshold.

In one embodiment, the processor is further configured to discard the new operation instruction and obtain the new operation instruction of the user if the new operation instruction of the user is equivalent to the operation instruction at the tail of the operation instruction queue.

The advantageous effect of the embodiments of the present disclosure is that, unlike the case of the prior art, the embodiments of the present disclosure compares the operation instruction issued by the user with the operation instruction at the tail of the operation instruction queue when the human-machine interface is busy, and stores the operation instruction issued by the user in the operation instruction queue to allow the human-machine interface to call and execute the operation instruction in the operation instruction queue when the two are determined to be inequivalent. In addition, when the human-machine interface is not busy, it is no longer to compare the operation instruction issued by the user with the operation instruction at the tail of the operation instruction queue, and the operation instruction issued by the user is directly stored in the operation instruction queue to allow the human-machine interface to call and execute the operation instruction in the operation instruction queue. It can be seen that the present disclosure is still capable of keeping receiving the operation instruction through the operation instruction queue while the human-machine interface is busy, and does not cause the loss of valid operation instructions. Furthermore, when a system is busy, the redundant operation instructions issued by the user can be filtered out by discarding the equivalent operation instructions so as to avoid the backlog of invalid operation instructions, thereby effectively reducing the execution burden of the human-machine interface, shortening the delay time of the response to the operation instructions, and improving the user experience.

DETAILED DESCRIPTION

In order to make the objects, technical solutions and technical effects of the present disclosure more clear, the embodiments of the present disclosure will be described in further detail with reference to FIGS. 1-5.

Figure 1:
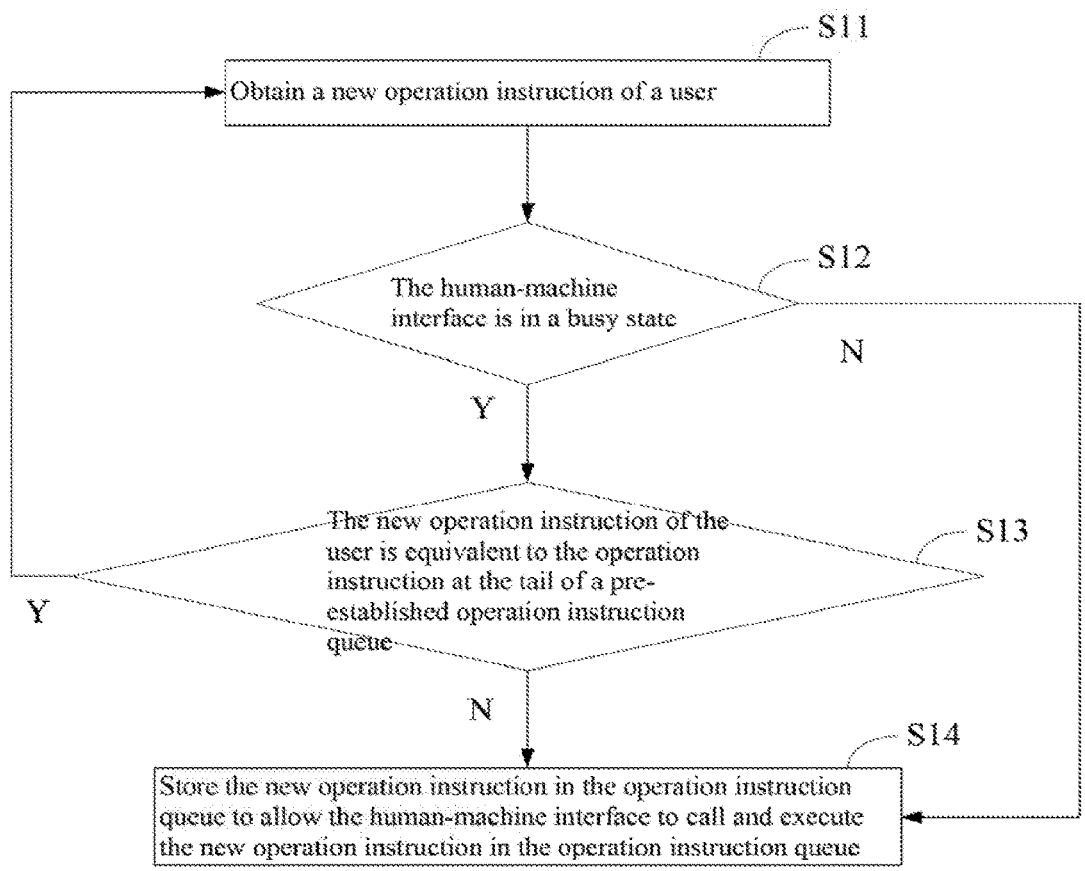
FIG. 1 is a flow chart of an operation instruction response control method for a human-machine interface according to a first embodiment of the present disclosure.

Referring to FIG. 1, a flow chart of an operation instruction response control method for a human-machine interface according to a first embodiment of the present disclosure is depicted. The control method may include the following blocks.

At S11: obtaining a new operation instruction of a user.

For instance, in this embodiment, the human-machine interface may include one or more terminal operation interfaces with menu items which preferably encapsulate the interfaces of the function calls of an operating system and the application programs of a terminal device. When the user issues an operation instruction through an input means of the terminal device, a hardware part of the human-machine interface transmits the operation instruction to a processor through the function call interface of the operating system and the application program interface which are provided by an interface adaptation layer, thereby obtaining the operation instruction newly issued by the user.

In this embodiment, the terminal device may be any terminal device with a human-machine interface. For example, it may be an industrial control device such as a programmable logic controller (PLC), a variable-frequency drive, a direct-current governor, and a meter, or a mobile terminal such as an electronic notebook, a personal digital assistant (PDA), a portable communication device, and a smartphone. The human-machine interface can be displayed utilizing a display screen of the terminal device, and the operation instruction issued by the user or the working parameter inputted by the user can be obtained through the input means such as a touch screen, a keyboard, and a mouse, thereby realizing the information conversion between an internal form and a human-readable form.

At S12: determining whether the human-machine interface is in a busy state.

As an interface between human and machine, the human-machine interface is composed of a hardware part and a software part in an actual application scene. The hardware part may include the processor, a display unit, an input unit, a communication interface, a data storage unit, etc. The performance of the processor to be the core unit determines the overall performance of the human-machine interface. The software part generally includes a system software executed in the hardware part and a screen configuration software executed in the operating system such as Windows of a personal computer. It should be noted that, the hardware part of the human-machine interface can be the hardware of the terminal device, and the software part of the human-machine interface can be an operating system of the terminal device which can be regarded as an embedded operating system of the terminal device.

The human-machine interface processes the operation instructions in a pre-established operation instruction queue. The establish of an operation instruction queue can be realized by, for example, utilizing the screen configuration software of the human-machine interface to compose a project file which is capable of representing the operation instruction queue first, and then transmitting the composed project file to the processor to execute via the connection of the personal computer and a serial communication interface of the hardware part (i.e., the input unit) of the human-machine interface. It is to be understood that the operation instruction queue is represented as a combination of a plurality of data codes corresponding to each operation instruction in an actual application scene.

The busy state of the human-machine interface represents which has a heavier operation load, which can be represented as a longer delay time of the response to the operation instruction. If the human-machine interface is determined to be in the busy state, step S13 is executed. If the human-machine interface is determined to be not in the busy state, the current method to process the operation instruction is maintained, that is, step S14 is executed.

At S13: determining whether the new operation instruction of the user is equivalent to the operation instruction at the tail of the pre-established operation instruction queue.

If the new operation instruction of the user is determined to be equivalent to the operation instruction at the tail of the pre-established operation instruction queue, the new operation instruction of the user is discarded, and step S11 of obtaining the new operation instruction of the user is continued to execute.

If the new operation instruction of the user is determined to be inequivalent to the operation instruction at the tail of the pre-established operation instruction queue, step S14 is executed.

At S14: storing the new operation instruction in the operation instruction queue to allow the human-machine interface to call and execute the new operation instruction in the operation instruction queue.

The processor of the human-machine interface calls the operation instruction in the operation instruction queue from the data storage unit via the function call interface of the operating system provided by the interface adaptation layer, and calls the operation instruction for the terminal device via the application program interface provided by the interface adaptation layer, so as to be executed by an application programs of the terminal device which is installed correspondingly. It is worth noting that the call and the execution of the operation instruction follow the principle of first-in first-out, that is, the operation instruction which is stored in the operation instruction queue first will be called and executed first, and the operation instruction which is stored in the operation instruction queue latter will be called and executed latter.

Figure 2:
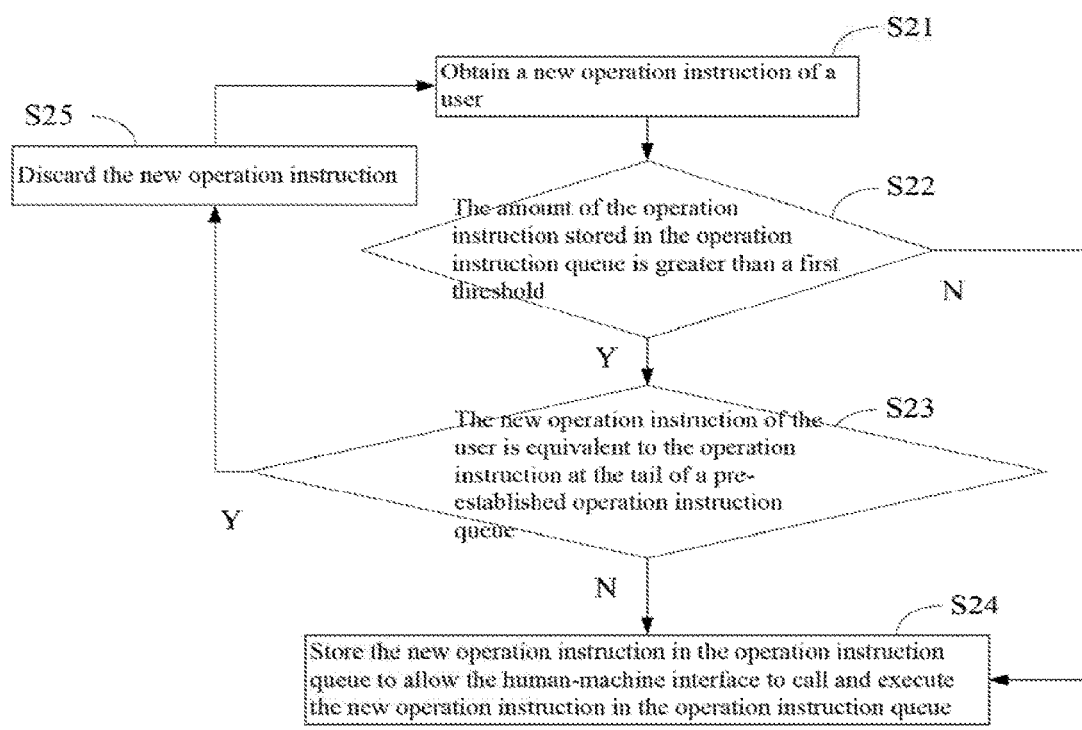
FIG. 2 is a flow chart of an operation instruction response control method for a human-machine interface according to a second embodiment of the present disclosure.

Referring to FIG. 2, a flow chart of an operation instruction response control method for a human-machine interface according to a second embodiment of the present disclosure is depicted. This embodiment is described on the basis of the first embodiment. The method may include the following blocks.

At S21: obtaining a new operation instruction of a user.

At S22: determining whether the amount of the operation instruction stored in the operation instruction queue is greater than a first threshold, and determining the human-machine interface to be in a busy state if the amount of the operation instruction is greater than the first threshold, that is, it is equivalent to step S12 in the first embodiment, and then step S23 is executed. Determining the human-machine interface to be not in the busy state if the amount of the operation instruction is smaller than or equal to the first threshold, and step S24 is executed.

This embodiment differs from the second method of the prior art in that, for an operation instruction newly issued by the user, the human-machine interface does not immediately add the operation instruction to the operation instruction queue after obtaining the operation instruction, but needs to consider that whether the operation instruction queue will overflow if the operation instruction is added, thereby avoiding the overload operation of the processor of the human-machine interface.

Based on this, the first threshold is set in this embodiment as the criterion of the limitation for the operation instruction queue, that is, the first threshold is the corresponding amount of the operation instruction stored in the operation instruction queue while the human-machine interface is in the busy state, which is utilized to ensure the processor of the human-computer interface to operate stably. The range of the first threshold cannot be too small, and should be able to basically ensure that the subsequent operation instructions issued by the user will not lose. Those skilled in the art will be able to obtain the specific values or ranges of the first threshold through the analysis and the summarization with respect to multiple specific events occurring in an actual application scene, while the first threshold is greater than or equal to zero and preferably an unsigned integer.

At S23: determining whether the new operation instruction of the user is equivalent to the operation instruction at the tail of a pre-established operation instruction queue.

If the new operation instruction of the user is determined to be equivalent to the operation instruction at the tail of the pre-established operation instruction queue, step S25 of discarding the new operation instruction is executed, and then step S21 of obtaining the new operation instruction of the user is continued to execute.

If the new operation instruction of the user is determined to be inequivalent to the operation instruction at the tail of the pre-established operation instruction queue, step S24 is executed.

At S24: storing the new operation instruction of the user in the operation instruction queue to allow the human-machine interface to call and execute the new operation instruction in the operation instruction queue.

At S25: discarding the new operation instruction of the user.

Figure 3:
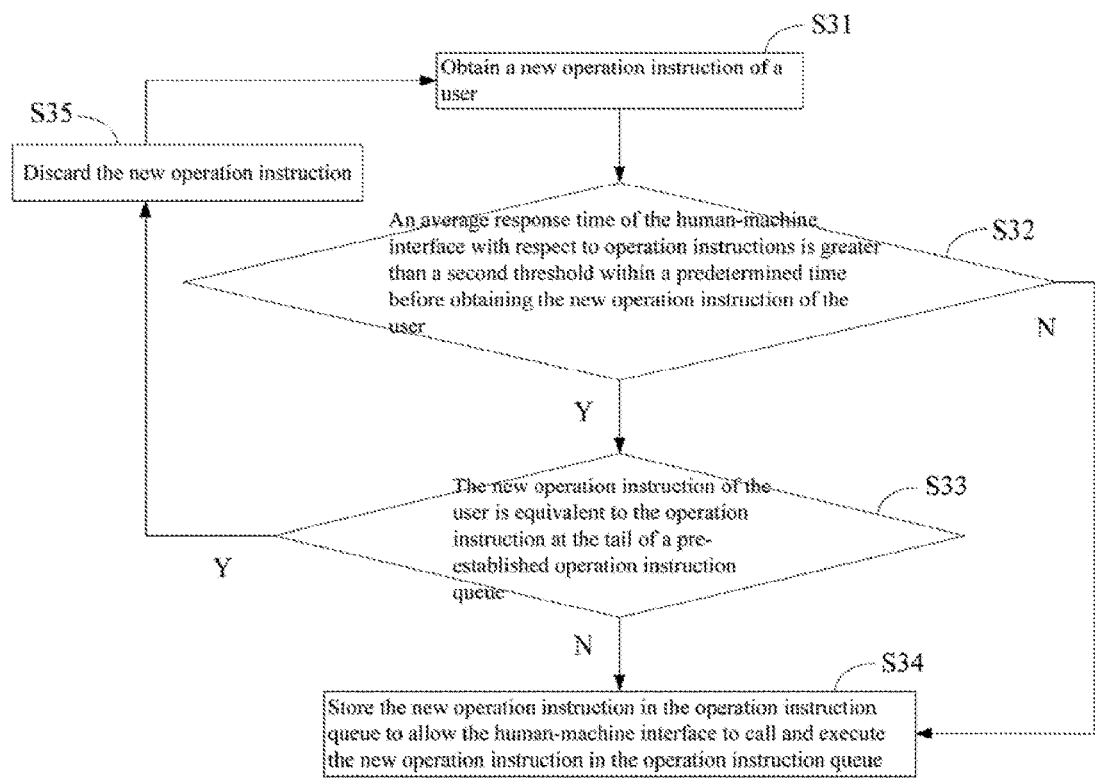
FIG. 3 is a flow chart of an operation instruction response control method for a human-machine interface according to a third embodiment of the present disclosure.

Referring to FIG. 3, a flow chart of an operation instruction response control method for a human-machine interface according to a third embodiment of the present disclosure is depicted. This embodiment is described on the basis of the first embodiment. The method may include the following blocks.

At S31: obtaining a new operation instruction of a user.

At S32: determining whether an average response time of the human-machine interface with respect to operation instructions is greater than a second threshold within a predetermined time before obtaining the new operation instruction of the user.

And, determining the human-machine interface to be in the busy state if the average response time is greater than the second threshold, that is, step S12 in the first embodiment, and then step S33 is executed. Determining the human-machine interface to be not in the busy state if the average response time is smaller than or equal to the second threshold, and step S34 is executed.

In this embodiment, the second threshold is used as the criterion to determine the busy state, which indicates the maximum value of the average response time of the human-machine interface with respect to the operation instructions while the human-machine interface is not in the busy state.

At S33: determining whether the new operation instruction of the user is equivalent to the operation instruction at the tail of a pre-established operation instruction queue.

If the new operation instruction of the user is determined to be equivalent to the operation instruction at the tail of the pre-established operation instruction queue, step S35 of discarding the new operation instruction is executed, and then step S31 of obtaining the new operation instruction of the user is continued to execute.

If the new operation instruction of the user is determined to be inequivalent to the operation instruction at the tail of the pre-established operation instruction queue, step S34 is executed.

At S34: storing the new operation instruction in the operation instruction queue to allow the human-machine interface to call and execute the new operation instruction in the operation instruction queue.

At S35: discarding the new operation instruction.

The second embodiment and the third embodiment exemplify the specific methods to determine whether the human-machine interface is busy. Of course, it is possible to use other suitable determination methods to determine whether the human-machine interface is busy, for example, determining through the utility rate of the processor, which determines the human-machine interface to be busy when the utility rate of the processor is greater than a certain threshold. The determination of whether the human-machine interface is busy is not limited to a specific method herein.

Figure 4:
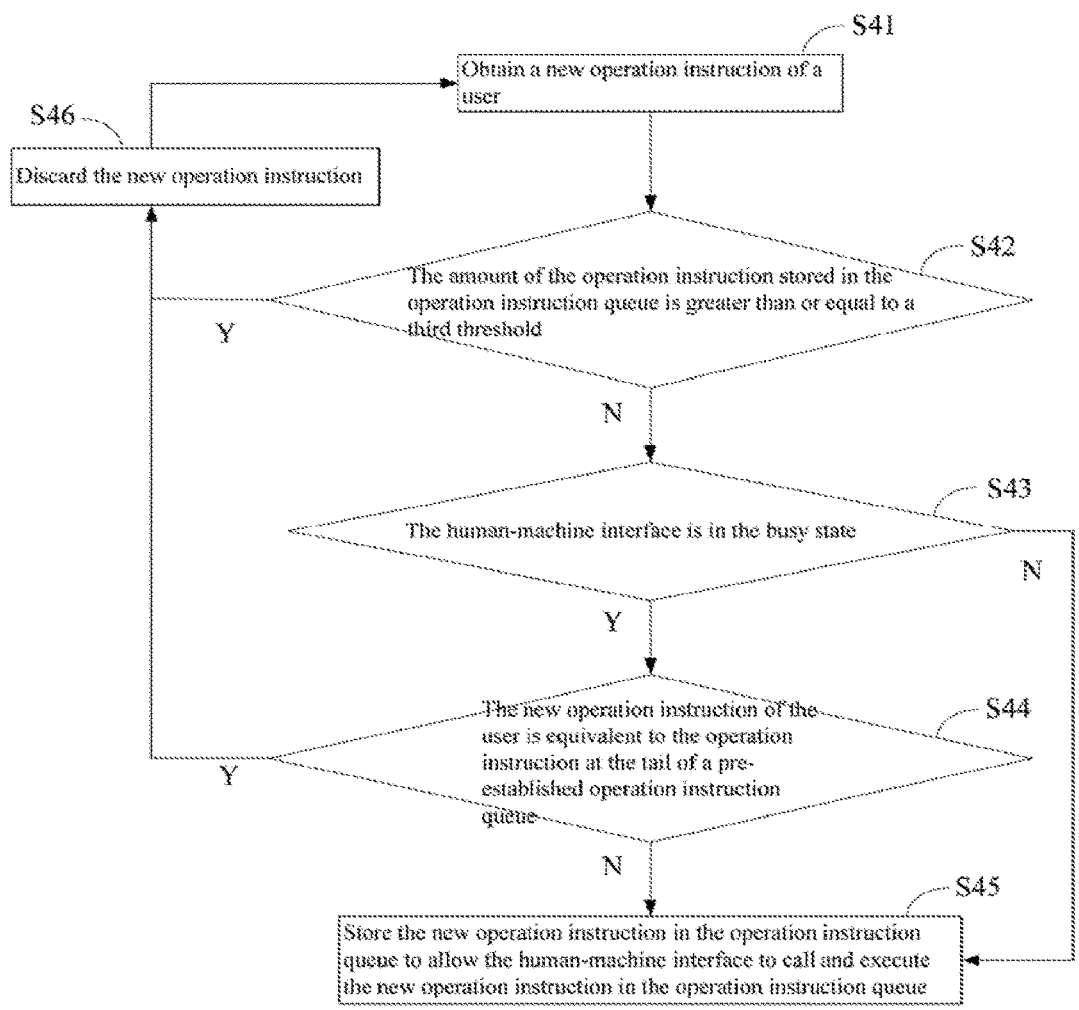
FIG. 4 is a flow chart of an operation instruction response control method for a human-machine interface according to a fourth embodiment of the present disclosure.

Referring to FIG. 4, a flow chart of an operation instruction response control method for a human-machine interface according to a fourth embodiment of the present disclosure is depicted. This embodiment is described on the basis of the first to the third embodiments. The method may include the following blocks.

At S41: obtaining a new operation instruction of a user.

At S42: determining whether the amount of the operation instruction stored in the operation instruction queue is greater than or equal to a third threshold.

If the amount of the operation instruction stored in the operation instruction queue is smaller than the third threshold, step S43 of determining whether the human-machine interface is in the busy state is executed.

If the amount of the operation instruction stored in the operation instruction queue is greater than or equal to the third threshold, step S46 of discarding the new operation instruction is executed.

In this embodiment, the third threshold (a predetermined threshold) indicates the upper limit of the amount of the operation instruction can be stored in the operation instruction queue, and the first threshold in the second embodiment indicates the corresponding amount of the operation instruction stored in the operation instruction queue while the human-machine interface is in the busy state, hence the third threshold is greater than the first threshold.

At S43: determining whether the human-machine interface is in the busy state.

If the human-machine interface is determined to be in the busy state, step S44 is executed. If the human-machine interface is determined to be not in the busy state, step S45 is executed.

In this step, the determining whether the human-machine interface is in the busy state can include the above-mentioned step S22 of the second embodiment or step S32 of the third embodiment.

At S44: determining whether the new operation instruction of the user is equivalent to the operation instruction at the tail of a pre-established operation instruction queue.

If the new operation instruction of the user is determined to be equivalent to the operation instruction at the tail of the pre-established operation instruction queue, step S46 of discarding the new operation instruction is executed, and then step S41 of obtaining the new operation instruction of the user is continued to execute.

If the new operation instruction of the user is determined to be inequivalent to the operation instruction at the tail of the pre-established operation instruction queue, step S45 is executed.

At S45: storing the new operation instruction in the operation instruction queue to allow the human-machine interface to call and execute the new operation instruction in the operation instruction queue.

At S46: discarding the new operation instruction.

Based on the above, it can be seen that this embodiment can still keep the reception of the operation instruction via the operation instruction queue while the human-machine interface is busy, which wouldn't cause the loss of effective operation instructions. In addition, the redundant operation instructions issued by the user can be filtered out by discarding the equivalent operation instructions so as to avoid the backlog of invalid operation instructions, thereby effectively reducing the execution burden of the human-machine interface, shortening the delay time of the response to the operation instructions, and improving the user experience.

Figure 5:
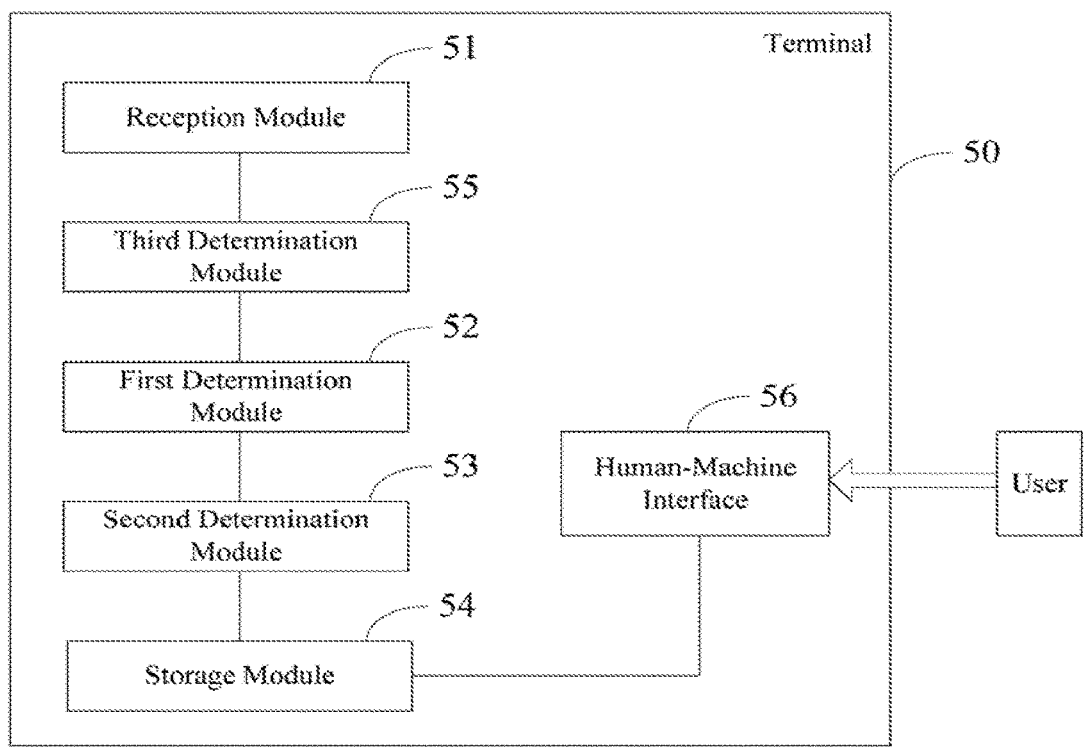
FIG. 5 is a schematic block diagram of a terminal with a human-machine interface according to a preferred embodiment of the present disclosure.

The present disclosure also provides a terminal with a human-machine interface. Referring to FIG. 5, a schematic block diagram of a terminal 50 with a human-machine interface 56 according to a preferred embodiment of the present disclosure is depicted. The terminal 50 can include a reception module 51, a first determination module 52, a second determination module 53, and a storage module 54.

The reception module 51 is configured to obtain a new operation instruction of a user;

The first determination module 52 is configured to determine whether the human-machine interface 56 is in a busy state;

The second determination module 53 is configured to determine whether the new operation instruction of the user which is obtained by the reception module 51 is equivalent to an operation instruction at the tail of a pre-established operation instruction queue if the first determination module 52 determines that the human-machine interface 56 is in the busy state.

If the first determination module 52 determines that the human-machine interface 56 is not in the busy state or the second determination module 53 determines that the new operation instruction of the user is inequivalent to the operation instruction at the tail of the operation instruction queue, the storage module 54 is configured to store the new operation instruction in the operation instruction queue to allow the human-machine interface 56 to call and execute the new operation instruction in the operation instruction queue.

If the second determination module 53 determines that the new operation instruction of the user is equivalent to the operation instruction at the tail of the operation instruction queue, the terminal 50 discards the new operation instruction and controls the reception module 51 to continue to obtain the new operation instruction of the user.

In this embodiment, the first determination module 52 determines whether the human-machine interface 56 is in the busy state, and the determination can be performed based on the amount of the operation instruction stored in the operation instruction queue or an average response time of the human-machine interface 56 with respect to operation instructions. In particular:

The first determination module 52 can be configured to determine whether the amount of the operation instruction stored in the operation instruction queue is greater than a first threshold, and determine the human-machine interface to be in the busy state if the amount of the operation instruction stored in the operation instruction queue is greater than the first threshold.

The first determination module 52 can also be configured to determine whether the average response time of the human-machine interface 56 with respect to operation instructions is greater than a second threshold within a predetermined time before obtaining the new operation instruction of the user, and determine the human-machine interface 56 to be in the busy state if the human-machine interface 56 with respect to operation instructions is greater than the second threshold.

In view of the upper limit of the amount of operation instructions can be stored in the operation instruction queue and the corresponding amount of operation instructions in the operation instruction queue while the human-machine interface 56 is in the busy state may be different, the terminal 50 may further include a third determination module 55.

The third determination module 55 is configured to determine whether the amount of the operation instruction stored in the operation instruction queue is greater than or equal to a third threshold.

The third threshold indicates the maximum value of the amount of the operation instruction allowed in the operation instruction queue, and the first threshold indicates the corresponding amount of the operation instruction in the operation instruction queue while the human-machine interface 56 is in the busy state, hence the third threshold is greater than the first threshold.

If the third determination module 55 determines that the amount of the operation instruction stored in the operation instruction queue is smaller than the third threshold, the first determination module 52 determines whether the human-machine interface 56 is in the busy state. If the third determination module 55 determines that the amount of the operation instruction stored in the operation instruction queue is greater than or equal to the third threshold, the terminal 50 discards the new operation instruction The terminal 50 of the embodiment shown in FIG. 5 of the present disclosure is based on the control method of the embodiment shown in FIG. 1, hence has a same advantage. Simultaneously, each of the functional modules is capable of executing the corresponding steps in the method embodiment, and will not be repeated again.

It is to be understood that the division of the description module of the terminal 50 disclosed in this embodiments of the present disclosure is merely a logical function division, and may be otherwise divided in an actual implementation, for example, a plurality of modules can be combined or integrated into another system, or some features can be ignored or not executed. In addition, the coupling or communicative connection between the modules may be via some interface, or may be in electrical or other manners.

Each of the above-mentioned functional modules may be part of the terminal 50; may or may not be a physical frame; may be either in one place, or distributed in a plurality of network elements; may be either implemented in the form of hardware, or implemented in the form of a software function frame. Those skilled in the art will be able to select some or all of the modules therein to achieve the objectives of the technical solution of the present disclosure in accordance with actual needs.

Figure 6:
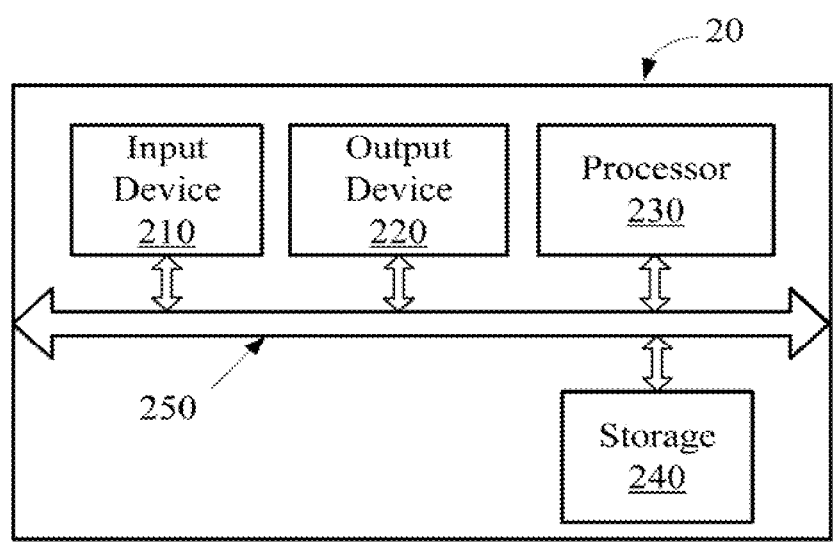
FIG. 6 is a schematic block diagram of a user device according to an embodiment of the present disclosure.

Referring to FIG. 6, a schematic block diagram of a user device 20 according to an embodiment of the present disclosure is depicted. The user device 20 includes an input device 210, an output device 220, a processor 230, and a storage 240.

In this embodiment, the input device 210, the output device 220, the processor 230, and the storage 240 may implement a bus connection via a bus 250. Of course, the input device 210, the output device 220, the processor 230, and the storage 240 may also adopt other connection means, which will not be limited herein.

The storage 240 may include read-only memory and random access memory, and provide instructions and data to the processor 230. A portion of the storage 240 may also include a nonvolatile random access memory (NVRAM).

In this embodiment, the processor 230 executes the following operations by calling operation instructions stored in the storage 240 (which can be stored in an operating system):

obtaining a new operation instruction of a user;

determining whether the human-machine interface is in a busy state;

determining whether the new operation instruction of the user is equivalent to an operation instruction at the tail of a pre-established operation instruction queue if the human-machine interface is in the busy state; and storing the new operation instruction in the operation instruction queue to allow the human-machine interface to call and execute the new operation instruction in the operation instruction queue if the human-machine interface is not in the busy state or the new operation instruction of the user is inequivalent to the operation instruction at the tail of the operation instruction queue.

In this embodiment, the processor 230 determines whether the amount of the operation instruction stored in the operation instruction queue is greater than a first threshold, and determines the human-machine interface to be in a busy state if greater than the first threshold. Alternatively, the processor 230 determines whether an average response time of the human-machine interface with respect to operation instructions is greater than a second threshold within a predetermined time before obtaining the new operation instruction of the user, and determines the human-machine interface to be in the busy state if greater than the second threshold.

Preferably, after the processor 230 obtains the new operation instruction of the user, and before the processor 230 determines whether the human-machine interface is in the busy state, the processor 230 is further configured to: determine whether the amount of the operation instruction stored in the operation instruction queue is greater than or equal to a third threshold; determine whether the human-machine interface is in the busy state if the amount of the operation instruction stored in the operation instruction queue is smaller than the third threshold; and discard the new operation instruction if the amount of the operation instruction stored in the operation instruction queue is greater than or equal to the third threshold.

Preferably, the processor 230 is further configured to discard the new operation instruction and obtain the new operation instruction of the user if the new operation instruction of the user is equivalent to the operation instruction at the tail of the operation instruction queue.

The foregoing are merely embodiments of the present disclosure, and is not intended to limit the scope of the present disclosure, and the transformations of equivalent structure or equivalent method which are made based on the specification and the drawings of the present disclosure, for example, the integration of the technical characteristic between each of the embodiments, and the direct or indirect applications in other related technical fields, are likewise included within the scope of the protection of the present disclosure.

What is claimed is:

1. An operation instruction response control method for a human-machine interface, comprising:

obtaining a new operation instruction of a user;

determining whether an amount of the operation instruction stored in a pre-established operation instruction queue is greater than or equal to a predetermined threshold;

discarding the new operation instruction if the amount of the operation instruction stored in an operation instruction queue is greater than or equal to the predetermined threshold;

determining whether the amount of the operation instruction stored in an operation instruction queue is greater than a first threshold to determine whether the human-machine interface is in a busy state if the amount of the operation instruction stored in an operation instruction queue is smaller than the predetermined threshold;

determining the human-machine interface to be in the busy state and determining whether the new operation instruction of the user is equivalent to an operation instruction at a tail of the operation instruction queue if the amount of the operation instruction stored in the operation instruction queue is greater than the first threshold, and discarding the new operation instruction and executing the obtaining the new operation instruction of the user if the new operation instruction of the user is equivalent to the operation instruction at the tail of the operation instruction queue; and storing the new operation instruction in the operation instruction queue to allow for the human-machine interface to call and execute the new operation instruction in the operation instruction queue if the human-machine interface is determined to be not in the busy state when the amount of the operation instruction stored in the operation instruction queue is smaller than or equal to the first threshold or the new operation instruction of the user is inequivalent to the operation instruction at the tail of the operation instruction queue.

2. The method of claim 1, wherein the obtaining the new operation instruction of the user comprises:

obtaining the new operation instruction of the user through at least one of a touch screen, a keyboard, and a mouse.

3. An operation instruction response control method for a human-machine interface, comprising:

obtaining a new operation instruction of a user;

determining whether an amount of the operation instruction stored in the operation instruction queue is greater than or equal to a third threshold;

discarding the new operation instruction if the amount of the operation instruction stored in an operation instruction queue is greater than or equal to the third threshold; and determining whether the human-machine interface is in the busy state if the amount of the operation instruction stored in the operation instruction queue is smaller than the third threshold;

determining whether the new operation instruction of the user is equivalent to an operation instruction at a tail of a pre-established operation instruction queue if the human-machine interface is in the busy state;

storing the new operation instruction in the operation instruction queue if the human-machine interface is not in the busy state or the new operation instruction of the user is inequivalent to the operation instruction at the tail of the operation instruction queue; and discarding the new operation instruction and executing the obtaining the new operation instruction of the user if the new operation instruction of the user is equivalent to the operation instruction at the tail of the operation instruction queue.

4. The method of claim 3, wherein the determining whether the human-machine interface is in the busy state comprises:

determining the human-machine interface to be in the busy state if the amount of the operation instruction stored in the operation instruction queue is greater than a first threshold.

5. The method of claim 3, wherein the determining whether the human-machine interface is in the busy state comprises:

determining the human-machine interface to be in the busy state if an average response time of the human-machine interface with respect to operation instructions is greater than a second threshold within a predetermined time before obtaining the new operation instruction of the user.

6. A terminal with a human-machine interface, comprising a non-transitory memory storing a plurality of programs and a processor, wherein the programs when executed by the processor, cause the processor to perform operations, comprising:

obtaining a new operation instruction of a user;

determining whether an amount of the operation instruction stored in the operation instruction queue is greater than or equal to a third threshold;

discarding the new operation instruction if the amount of the operation instruction stored in an operation instruction queue is greater than or equal to the third threshold; and determining whether the human-machine interface is in the busy state if the amount of the operation instruction stored in the operation instruction queue is smaller than the third threshold;

determining whether the new operation instruction of the user is equivalent to an operation instruction at a tail of a pre-established operation instruction queue if determining the human-machine interface being in the busy state;

storing the new operation instruction in the operation instruction queue if determining the human-machine interface being not in the busy state or determining the new operation instruction of the user being inequivalent to the operation instruction at the tail of the operation instruction queue; and discarding the new operation instruction and obtaining the new operation instruction of the user if determining the new operation instruction of the user being equivalent to the operation instruction at the tail of the operation instruction queue.

7. The terminal of claim 6, wherein the operations further comprise determining the human-machine interface to be in the busy state if the amount of the operation instruction stored in the operation instruction queue is greater than a first threshold.

8. The terminal of claim 6, wherein the operations further comprise determining the human-machine interface to be in the busy state if an average response time of the human-machine interface with respect to operation instructions is greater than a second threshold within a predetermined time before obtaining the new operation instruction of the user.

9. An operation instruction response control device for a human-machine interface comprising an input device, an output device, a processor, and a storage, wherein the processor is configured to:

obtain a new operation instruction of a user;

determine whether an amount of the operation instruction stored in the operation instruction queue is greater than or equal to a third threshold;

discard the new operation instruction if the amount of the operation instruction stored in an operation instruction queue is greater than or equal to the third threshold; and determine whether the human-machine interface is in the busy state if the amount of the operation instruction stored in the operation instruction queue is smaller than the third threshold;

determine whether the new operation instruction of the user is equivalent to an operation instruction at a tail of a pre-established operation instruction queue if the human-machine interface is in the busy state;

store the new operation instruction in the operation instruction queue if the human-machine interface is not in the busy state or the new operation instruction of the user is inequivalent to the operation instruction at the tail of the operation instruction queue; and discard the new operation instruction and obtain the new operation instruction of the user if the new operation instruction of the user is equivalent to the operation instruction at the tail of the operation instruction queue.

10. The device of claim 9, wherein the processor determines the human-machine interface to be in the busy state if the amount of the operation instruction stored in the operation instruction queue is greater than a first threshold.

11. The device of claim 9, wherein the processor determines the human-machine interface to be in the busy state if an average response time of the human-machine interface with respect to operation instructions is greater than a second threshold within a predetermined time before obtaining the new operation instruction of the user.

* * * * *